United States Patent
Maher et al.

(10) Patent No.: US 12,441,441 B2
(45) Date of Patent: Oct. 14, 2025

(54) SELF-DEPLOYING APPARATUS FOR ATTACHING A LASHING TO A CONTAINER

(71) Applicant: Trendsetter Vulcan Offshore, Inc., Houston, TX (US)

(72) Inventors: James V. Maher, Houston, TX (US); Rick Brown, Houston, TX (US); Jeffrey Daniels, Houston, TX (US); Daniel McCelvey, Houston, TX (US); Ben Kubichek, Houston, TX (US); Jon Kersey, Houston, TX (US); Steven Tran, Houston, TX (US)

(73) Assignee: Trendsetter Vulcan Offshore, Inc., Houston, TX (US)

( * ) Notice: Subject to any disclaimer, the term of this patent is extended or adjusted under 35 U.S.C. 154(b) by 0 days.

(21) Appl. No.: 19/119,051

(22) PCT Filed: Oct. 17, 2024

(86) PCT No.: PCT/US2024/051813
§ 371 (c)(1),
(2) Date: Apr. 7, 2025

(87) PCT Pub. No.: WO2025/085660
PCT Pub. Date: Apr. 25, 2025

(65) Prior Publication Data
US 2025/0263150 A1    Aug. 21, 2025

Related U.S. Application Data

(60) Provisional application No. 63/544,791, filed on Oct. 19, 2023.

(51) Int. Cl.
*B60P 7/08*    (2006.01)
*B63B 25/24*    (2006.01)
*B63B 25/28*    (2006.01)

(52) U.S. Cl.
CPC .............. *B63B 25/24* (2013.01); *B63B 25/28* (2013.01); *B63B 2025/285* (2013.01)

(58) Field of Classification Search
CPC ......... B60P 7/0807; B60P 7/0823; B60P 7/10; B60P 7/13; B60P 7/18; B63B 2025/285
(Continued)

(56) References Cited

U.S. PATENT DOCUMENTS 3,083,670 A * 4/1963 Harlander ................. B60P 7/13
114/201 R
3,934,855 A    1/1976 Patterson, III et al.
(Continued)

FOREIGN PATENT DOCUMENTS

WO    2022169484 A1    8/2022
WO    2023158829 A1    8/2023

OTHER PUBLICATIONS

USPTO, International Search Report mailed on Feb. 24, 2025 in parent application PCT/US2024/051813, 2 pages.
(Continued)

*Primary Examiner* — Stephen T Gordon
(74) *Attorney, Agent, or Firm* — Jonathan Pierce; Derek V. Forinash; Porter Hedges LLP (57) ABSTRACT

In order to stabilize the shipping containers that are stored on a cargo ship between a first column of shipping containers stacked at the starboard side of the cargo ship and a second column of shipping containers stacked at the port side of the cargo ship, supports are coupled to the tops of the first and second columns and foundations are coupled to the lashing bridge. Lashing are installed diagonally between the supports and the foundations using motorized pull-in winches. Tension is applied to the lashings spanning between the supports and the foundations using tensioning winches attached to the foundations.

15 Claims, 12 Drawing Sheets

(58) Field of Classification Search
USPC ...... 410/34, 68, 80, 81, 85, 97–98, 100, 103
See application file for complete search history.

(56) References Cited

U.S. PATENT DOCUMENTS

| | | | |
|---|---|---|---|
| 6,835,035 B1 * | 12/2004 | Hanninen | B63B 25/008 |
| | | | 410/85 |
| 11,312,454 B1 | 4/2022 | Maher et al. | |
| 2006/0088394 A1 * | 4/2006 | Bruun | B63B 25/28 |
| | | | 410/85 |
| 2015/0063937 A1 | 3/2015 | Brewster et al. | |
| 2019/0112010 A1 | 4/2019 | Hsieh et al. | |

OTHER PUBLICATIONS

USPTO, Written Opinion of the Internation Searching Authority mailed on Feb. 24, 2025 in parent application PCT/US2024/051813, 26pages.

* cited by examiner

SELF-DEPLOYING APPARATUS FOR ATTACHING A LASHING TO A CONTAINER

CROSS-REFERENCE TO RELATED APPLICATIONS

This application claims the benefit of priority to UU provisional application Ser. No. 63/544,791, filed on Oct. 19, 2023, and incorporated herein by reference for all or any purposes.

FIELD OF THE INVENTION

This disclosure relates generally to methods and systems for securing shipping containers on a cargo ship. This disclosure relates more particularly to methods and systems for lashing shipping containers that are less dependent on manual labor for being deployed.

BACKGROUND OF THE INVENTION

Cargo ships can accidentally lose large numbers of shipping containers at sea while sailing through heavy seas. As ships become bigger and shipping containers are stacked higher, the customary lashing system design, which has been used for many years, cannot provide an acceptable level of restraint. The movement of the upper containers that is caused by the ship's pitch and roll under the influence of waves increases. This movement can destabilize the shipping containers because of the higher acceleration levels of the upper containers.

Examples of known methods and systems for securing shipping containers on a cargo ship are described in the International application pub. no. WO 2022/169484, published on Aug. 11, 2022, and incorporated herein by reference.

Despite these advances, there is a need in the art for improved methods and systems for securing shipping containers on a cargo ship, which, in particular, may be less dependent on manual labor for being deployed.

SUMMARY

In one embodiment, the disclosure provides a lashing apparatus for deploying a lashing on cargo ships and securing shipping containers, comprising: a support capable of interfacing with an interlocking system of one or more shipping containers, wherein the support includes an overhang portion that is configured to hang over a longitudinal end of the one or more shipping containers when the interlocking system interfaces with the one or more shipping containers; a motorized pull-in winch attached to the support; a pull-in line attached to the motorized pull-in winch; electronics circuitry configured to drive the motorized pull-in winch for lifting or lowering the pull-in line; a plug attached to the pull-in line; a fastening line; a releasable connector, wherein the fastening line is selectively couplable to the plug via the releasable connector; and a lock provided in the overhang portion, the lock including a socket that is configured to receive and retain the plug. The fastening line is sufficiently stiff to withhold tension caused by the movements of the shipping containers and the releasable connector coupling the pull-in line and the fastening line may be of a known type.

In another embodiment, the disclosure provides a lashing system for deploying a lashing on cargo ships and securing shipping containers, comprising: a lashing apparatus including: a support capable of interfacing with an interlocking system of one or more shipping containers, wherein the support includes an overhang portion that is configured to hang over a longitudinal end of the one or more shipping containers when the interlocking system interfaces with the one or more shipping containers; a motorized pull-in winch attached to the support; a pull-in line attached to the motorized pull-in winch; electronics circuitry configured to drive the motorized pull-in winch for lifting or lowering the pull-in line; a plug attached to the pull-in line; a fastening line; a first releasable connector, wherein the fastening line is selectively couplable to the plug via the releasable connector; and a lock provided in the overhang portion, the lock including a socket configured to receive and retain the plug; and a bucket adapted to be coupled to a structure of the cargo ship, wherein the bucket is configured to receive the plug.

In a further embodiment, the disclosure provides a method of deploying a lashing on cargo ships and securing shipping containers, comprising: providing a lashing apparatus including a support, a motorized pull-in winch attached to the support, a pull-in line attached to the motorized pull-in winch, electronics circuitry configured to drive the motorized pull-in winch, a plug attached to the pull-in line, a lock provided in the overhang portion, the lock including a socket, and a first releasable connector; interfacing the support with an interlocking system of one or more shipping containers, wherein the support includes an overhang portion that is configured to hang over a longitudinal end of the one or more shipping containers when the interlocking system interfaces with the one or more shipping containers; coupling a fastening line to the plug via the first releasable connector; lifting the pull-in line until the plug is above the socket; and lowering the pull-in line until the plug is received and retained in the socket.

BRIEF DESCRIPTION OF THE DRAWINGS

For a more detailed description of the embodiments of the disclosure, reference will now be made to the accompanying drawings, wherein.

DETAILED DESCRIPTION

The invention is susceptible to various modifications and alternative forms, and specific embodiments thereof are shown by way of example in the drawings and description. It should be understood, however, that the drawings and description are not intended to limit the invention to the particular form disclosed, but on the contrary, the intention is to cover all modifications, equivalents, and alternatives available to a person having ordinary skill in the art.

In reference to FIGS. 1-5E, the description illustrates a preferred embodiment of a lashing apparatus for deploying a lashing and securing a stack of shipping containers.

Figure 1:
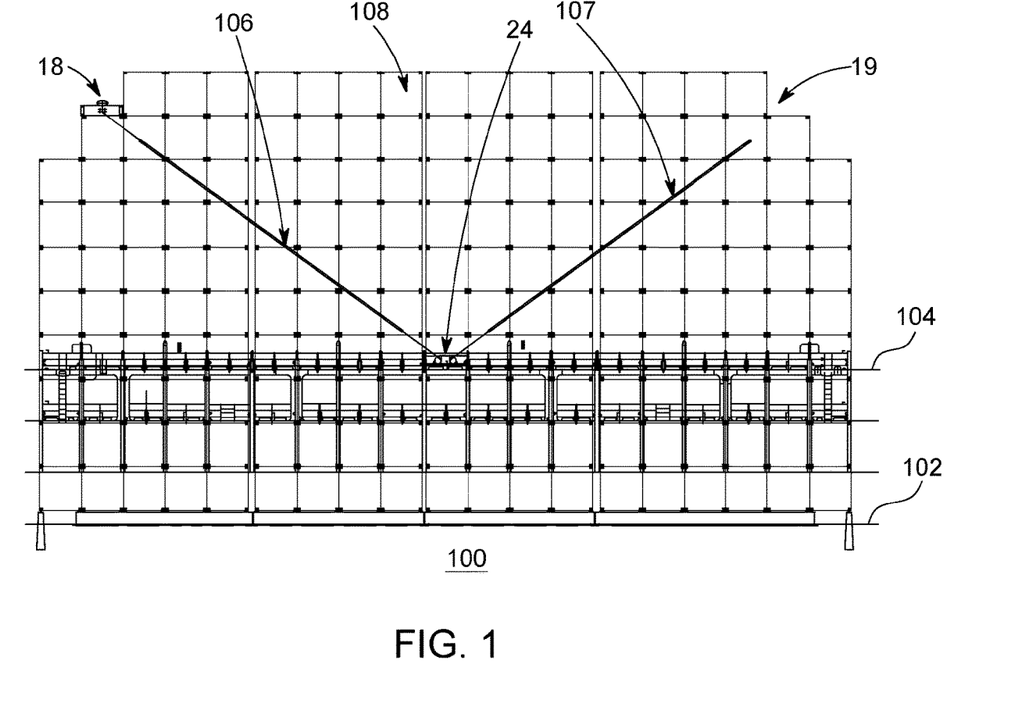
FIG. 1 is an elevation view of a cargo ship having shipping containers stacked thereon and a system for deploying a lashing on cargo ships and securing shipping containers, wherein the lashing system includes a support and an optional foundation.

FIG. 1 illustrates a cargo ship 100 that has a hatch top 102, on which containers are piled in a stack 108 having several columns. The lashing apparatus includes a foundation 24, a support 18, a lashing 106, and, optionally, another support 19 and another lashing 107. The foundation 24 is provided at a location proximate to the middle of the cargo ship 100. The foundation 24 is adapted to be coupled to a deck 104 of the cargo ship 100. As further detailed below, the lashing 106 (and the lashing 107 if provided) is segmented. The support 18 and/or 19 is capable of interfacing with an interlocking system of one or more shipping containers stacked in a column of containers.

In other embodiments, the foundation 24 may be adapted to be coupled to a lashing bridge of the cargo ship 100.

In other embodiments, the lashing 107 and the support 19 may be coupled to another foundation that is offset from the foundation 24.

In order to stabilize the shipping containers stored on the cargo ship 100 that are located between a first column of shipping containers stacked at the starboard side of the cargo ship and to which the support 18 is coupled, and a second column of shipping containers stacked at the port side of the cargo ship and to which the support 19 is coupled, tension is applied to the lashings 106 and 107.

Figure 2:
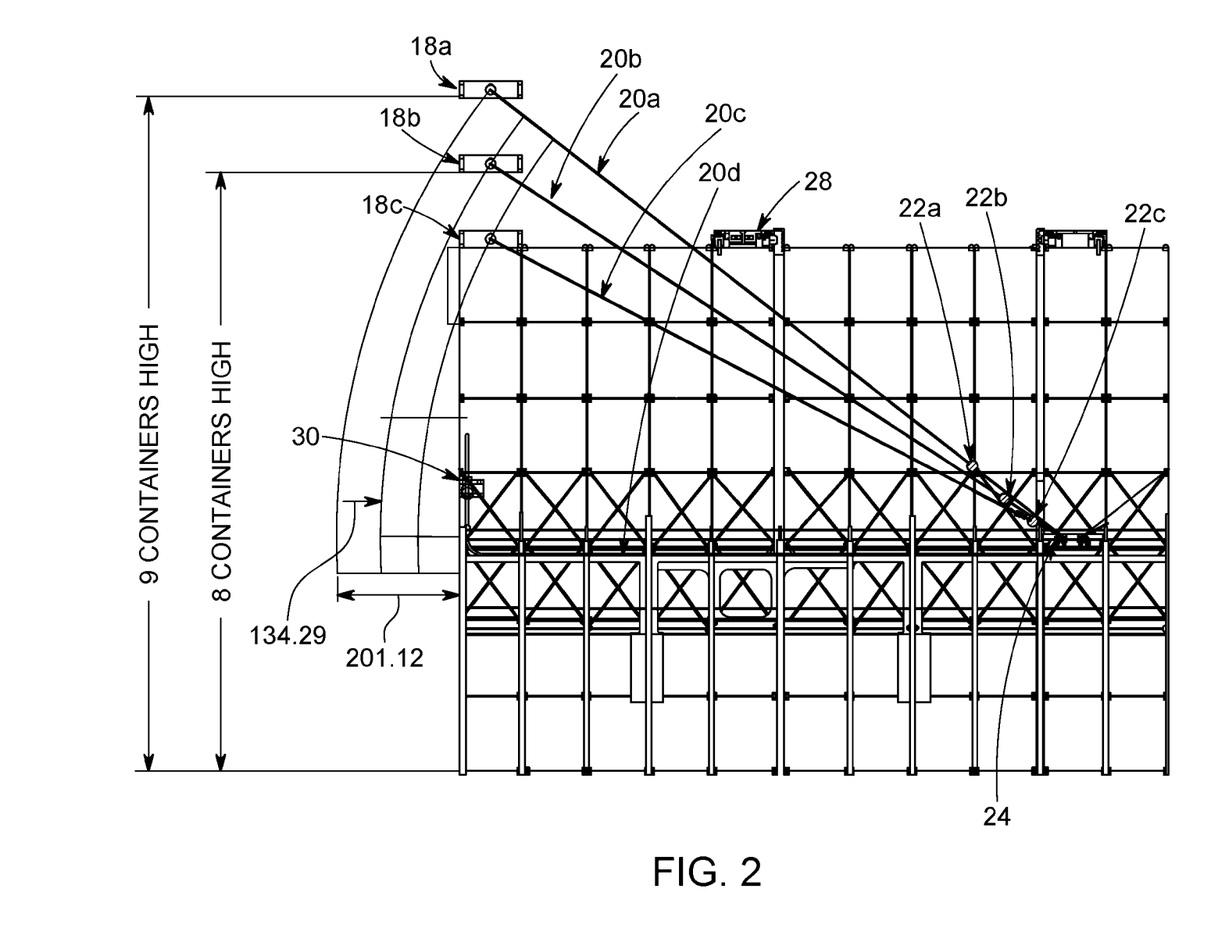
FIG. 2 is an elevation view of a portion of the system shown in FIG. 1, wherein three configurations of the stack of shipping containers are illustrated, and the height of the column of containers with which the support interfaces, varies between configurations.
Figure 3:
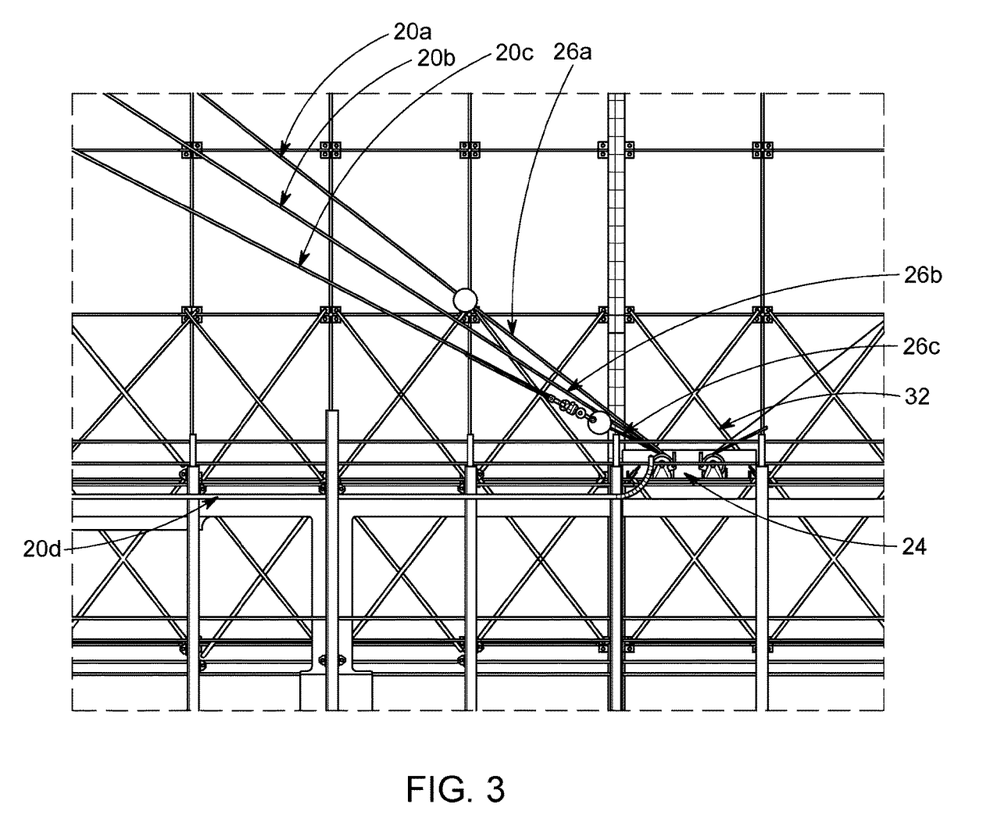
FIG. 3 is an elevation view of a foundation portion shown in FIG. 2.

FIGS. 2 and 3 illustrate various configurations of the stack 108, wherein the height of the first (i.e., leftmost) column varies. By way of example, the height varies between the height of seven and nine containers stacked from the hatch top 102. In this example, the support 18 is coupled to the top of the first column. It can be seen that the span of the lashing 106 varies as a consequence.

In order to accommodate this variation, the lashing 106 is segmented, and includes a wire rope (20a, 20b, or 20c) that has a standard length, and either one of a plurality of connections ropes (26a, 26b, 26c), each having a different length, or a single connection rope that has a standard length that is sufficient to accommodate the variation. A releasable connector (22a, 22b, or 22c) couples the connection rope (26a, 26b, 26c) to the wire rope (20a, 20b, 20c), respectively, and form the lashing 106 shown in FIG. 1.

By way of example, the wire rope (20a, 20b, 20c, or 20d) may have a length of 78.33 feet, and may have a diameter of ¾ of an inch. As such, the wire rope (20a, 20b, 20c, and 20d) can be stowed horizontally on the deck 104, as is illustrated by the wire rope 20d. The connection rope 26a may have a length of at least approximately 14.8 feet, the connection rope 26b may have a length of at least 8.4 feet, and the connection rope 26c may have a length of at least approximately 5 feet. Alternatively, the connection ropes 26a, 26b, and 26c may have the same standard length of at least approximately 14.8 feet.

In order to install the lashing 106, a wire rope (20a, 20b, or 20c) is provided. The wire rope (20a, 20b, or 20c) can be stowed horizontally on the deck 104, and is illustrated by the wire rope 20d. Then, one of the connection ropes (26a, 26b, or 26c) may be selected based on the height of the first column, the standard length of the wire rope (20a, 20b, or 20c), and the location where the foundation 24, or a connection rope of standard length may be used. The connection rope (26a, 26b, or 26c) is attached to a tensioning winch 32 (e.g., a manual winch accessible by an operator on the deck), and the connection rope (26a, 26b, or 26c) is coupled to an end of the wire rope (20a, 20b, or 20c) via the releasable connector (22a, 22b, or 22c). Then, the lashing 106 is deployed by lifting the other end of the wire rope (20a, 20b, 20c), as is explained below.

Back in reference to FIGS. 1 and 2, the connection rope (26a, 26b, or 26c) and the tensioning winch 32 are such that they can accommodate different heights of the side stack. Also, the tension in the lashing 106 can be adjusted by reeling in or out the connection rope with the tensioning winch attached to the foundation 24. Compression guides 28 (in FIG. 2) are placed between columns of stack 108 so as to pre-load the containers from opposing sides when tension is applied to the lashings 106 and 107. Examples of compression guides are illustrated in application serial no. PCT/US2023/013349, filed on Feb. 17, 2023.

Figure 4:
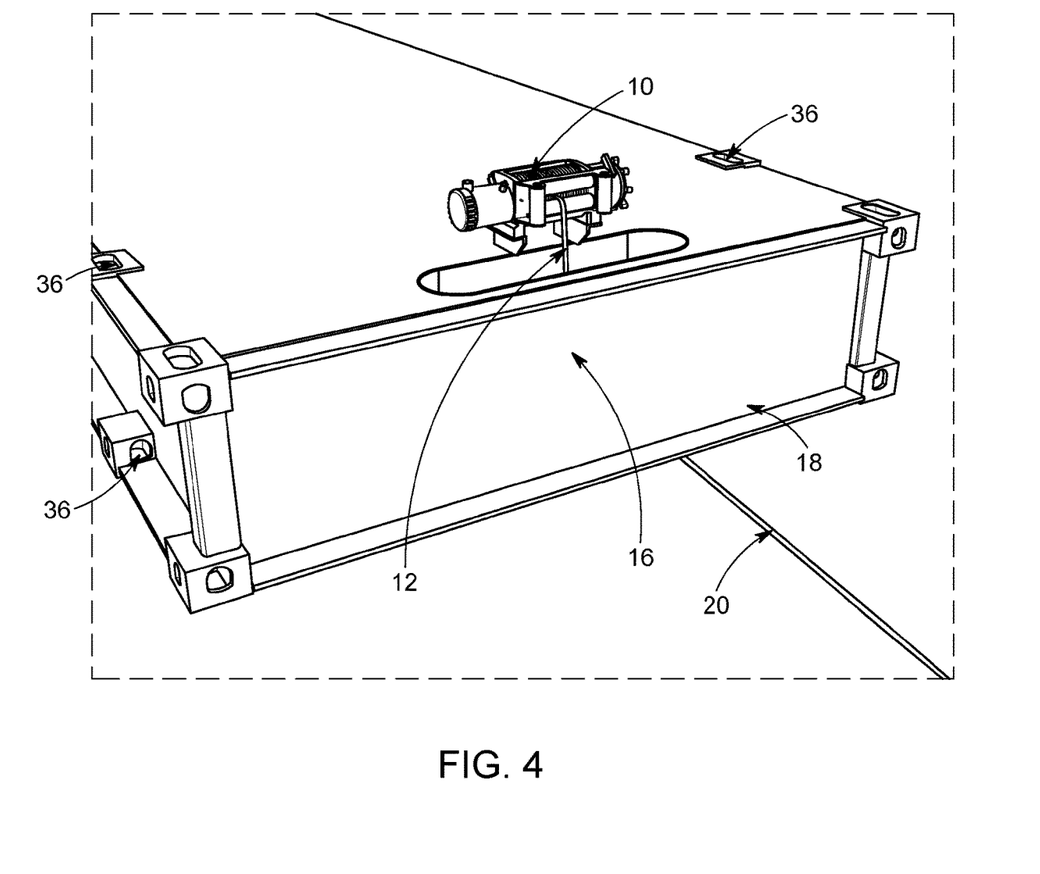
FIG. 4 is a perspective view of a support portion shown in FIG. 2.

FIG. 4 illustrates the support 18. In the preferred embodiment, the support 18 includes a flat rack. The flat rack may be forty-five feet long so that the flat rack has a portion 16 that overhangs a typical forty feet long container when the interlocking systems at locations 36 interface with the typical forty feet long container. A passive lock is provided in the overhang portion 16. As explained in more detail below, the passive lock includes a socket that is configured to receive and retain a plug attached to an end of the wire rope 20 (i.e., one of the wire ropes 20a, 20b, or 20c illustrated in FIGS. 2 and 3). As mentioned previously, the end of the wire rope 20 attached to the plug is lifted from the deck 104. In particular, the end of the wire rope 20 is lifted using a motorized pull-in winch 10 attached to a pull-in rope 12, and in turn attached to the motorized pull-in winch 10.

The sequence of steps illustrated in FIGS. 5A-5E, in which some of the portion 16 is cut away to see the passive lock, is used to retain the plug 14 in the passive lock.

Figure 5A:
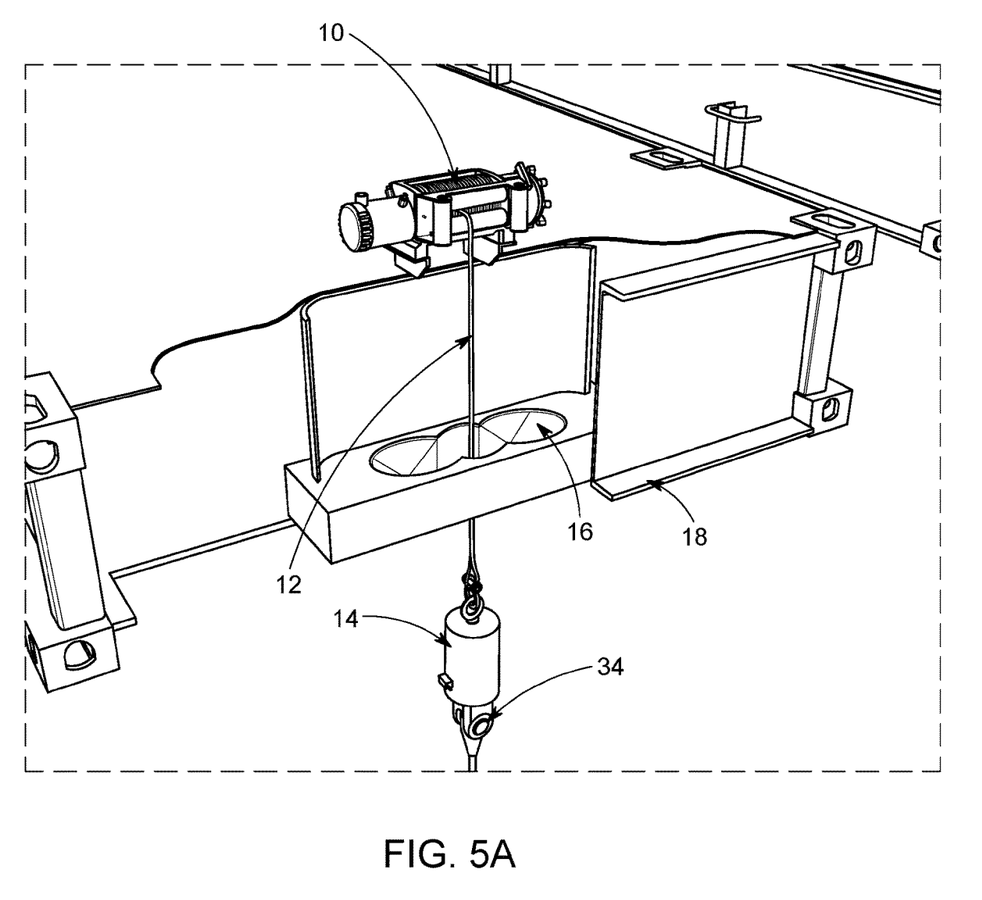
FIGS. 5A-5E are partially cut views illustrating a sequence for retaining a plug into a socket in a passive lock.

In reference to Figure 5A, the plug 14 is attached to the pull-in rope 12. The plug 14 may provide a housing for a tension monitor, its associated electronics, and a battery. In this Figure, the plug 14 is not yet coupled to the wire rope 20. The motorized pull-in winch 10 lowers the plug 14 at the end of the pull-in rope 12 until the plug is received in a bucket 30, as is shown in FIGS. 5B and 2.

Figure 5B:
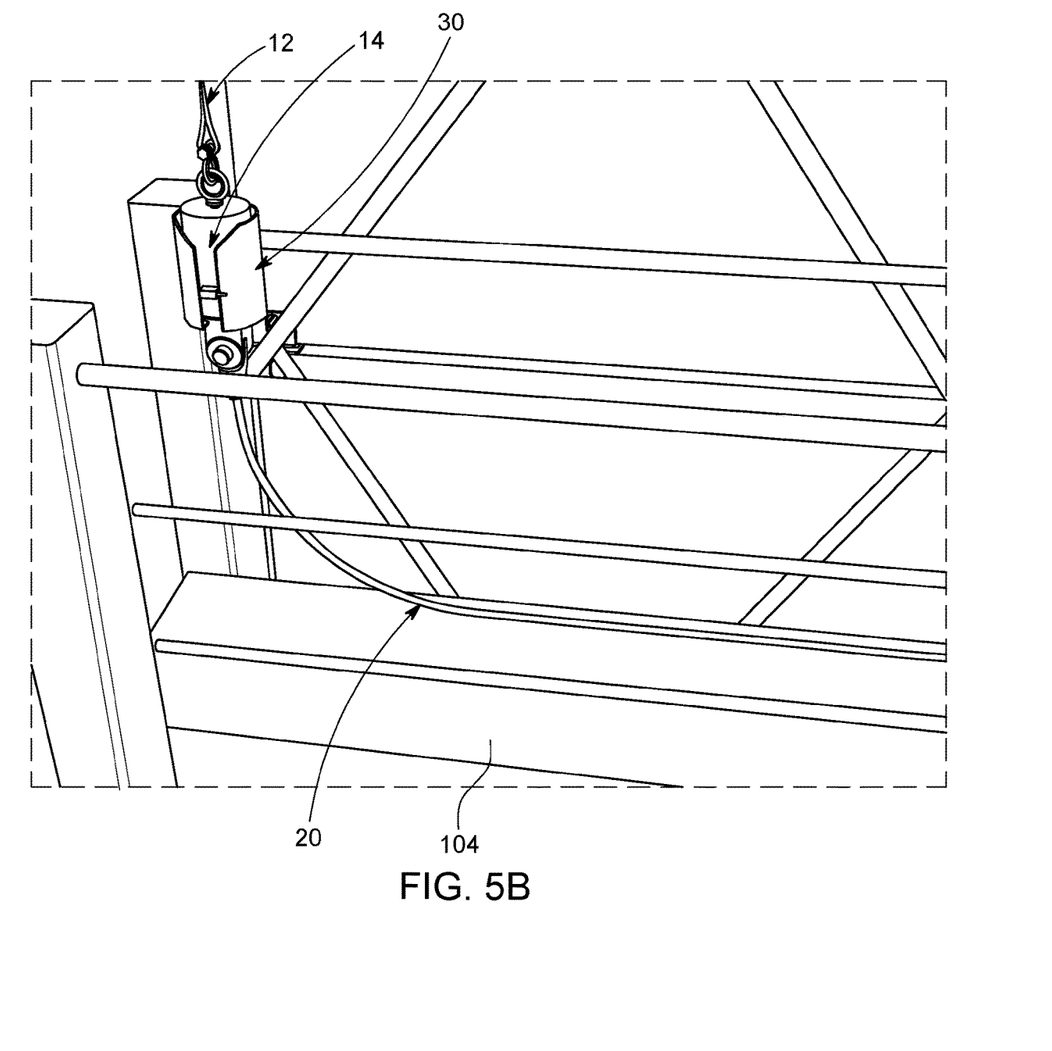
Figure 5C:
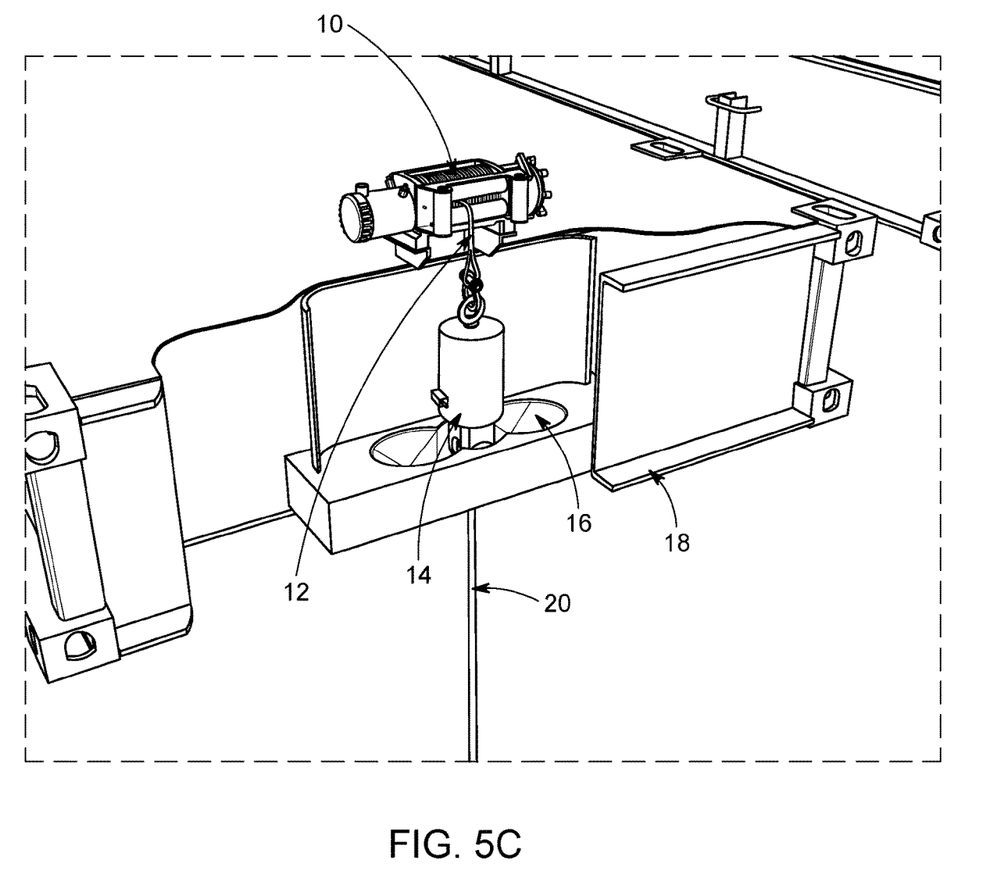

In reference to FIG. 5B, a wire rope 20 that is stowed on the deck 104 is then coupled to the plug via the releasable connector 34. The motorized pull-in winch 10 lifts the plug 14 at the end of the pull-in rope 12 until the plug 14 passes through the overhang portion 16, as is shown in FIG. 5C.

Figure 5D:
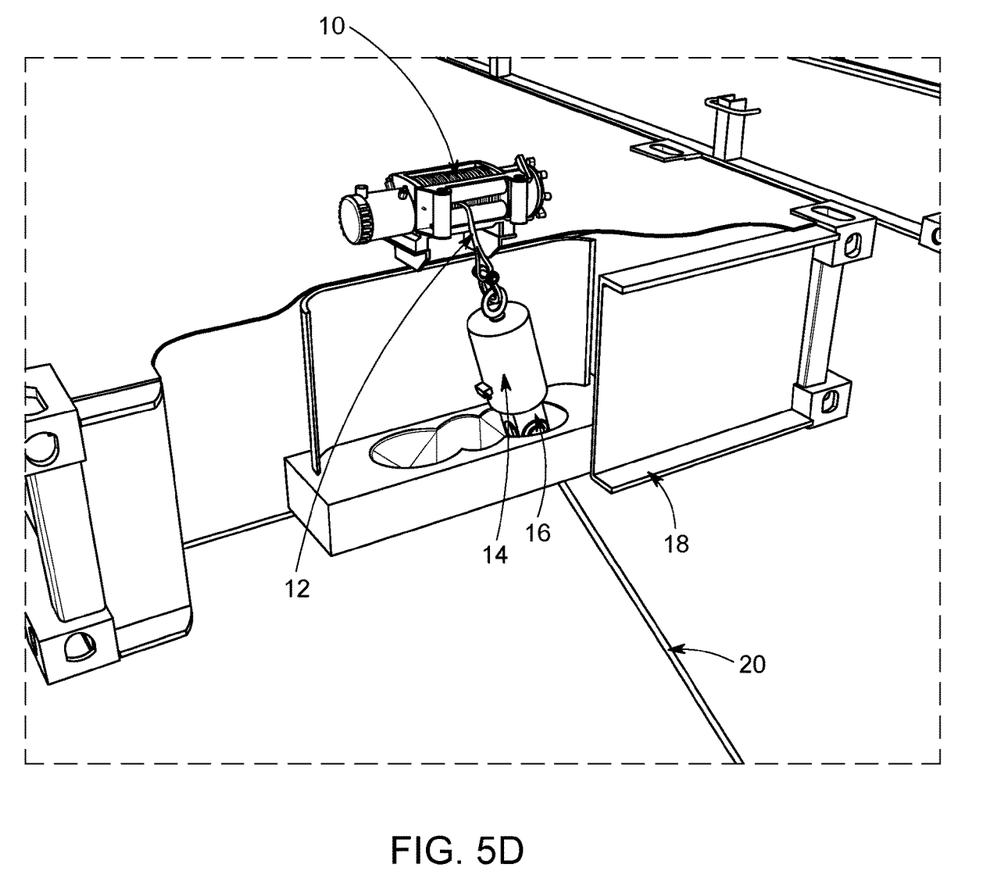

In reference to FIGS. 5D and 2, the wire rope 20 is partially reeled in using the tensioning winch 32 and the connection rope. This partial reel-in causes the plug 14 to move and tilt so that the plug 14 can be received into a socket of the passive lock because the socket has a middle axis that is tilted relative to vertical and substantially tangent to a circumference of a rope guide of the motorized pull-in winch.

If the support 19 had been illustrated in FIG. 5D instead of the support 18, the partial reel-in of the wire rope 20 would have caused the plug 14 to move and tilt in a direction opposite to the direction illustrated in FIG. 5D. Regardless of the direction, the plug 14 could still be received into another socket of the passive lock.

Thus, the same design of passive lock can optionally be used at the starboard or port side of the stack of shipping containers. In alternative embodiments, only one of the two sockets may be provided in the passive lock, and two different designs of passive locks may be needed.

Figure 5E:
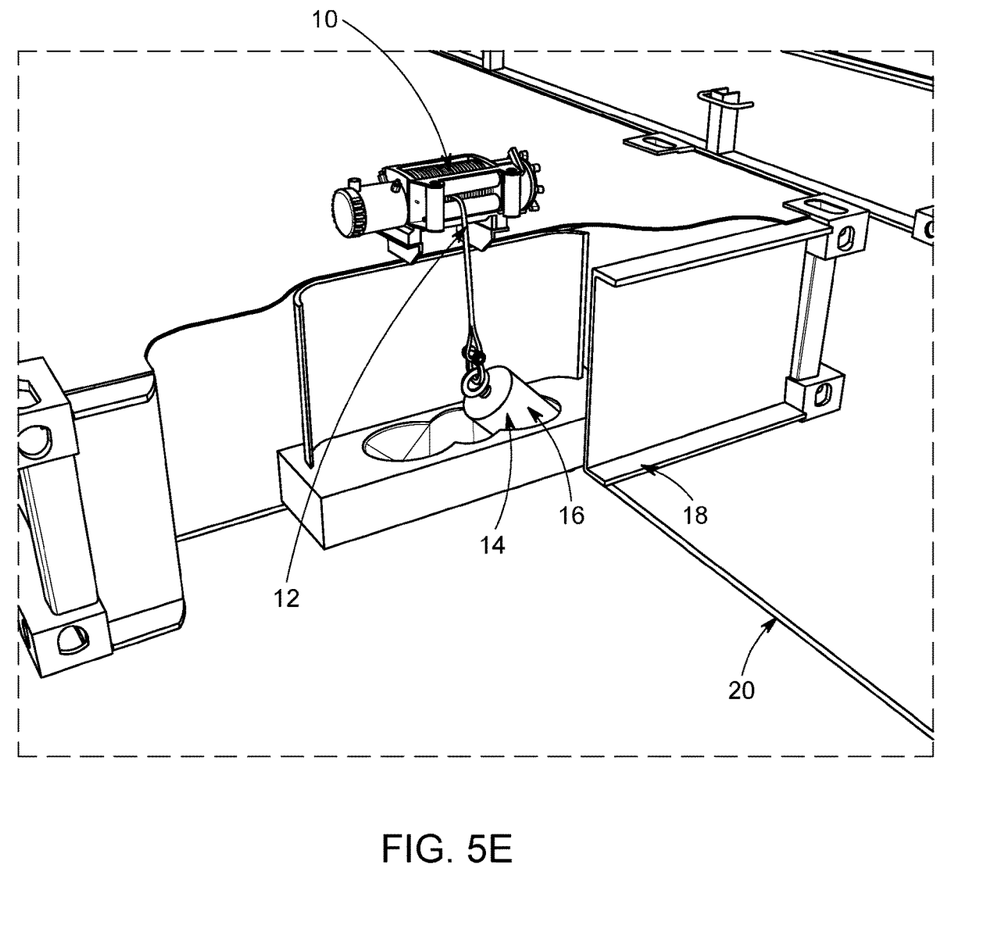

In reference to FIGS. 5E and 1, the plug 14 is again lowered at the end of the pull-in rope 12 by the motorized pull-in winch 10. However, once received in a socket, the plug 14 becomes retained in the socket, at which time further tension can be applied to the lashing 106 to stabilize the shipping containers stored on the cargo ship 100.

Figure 6:
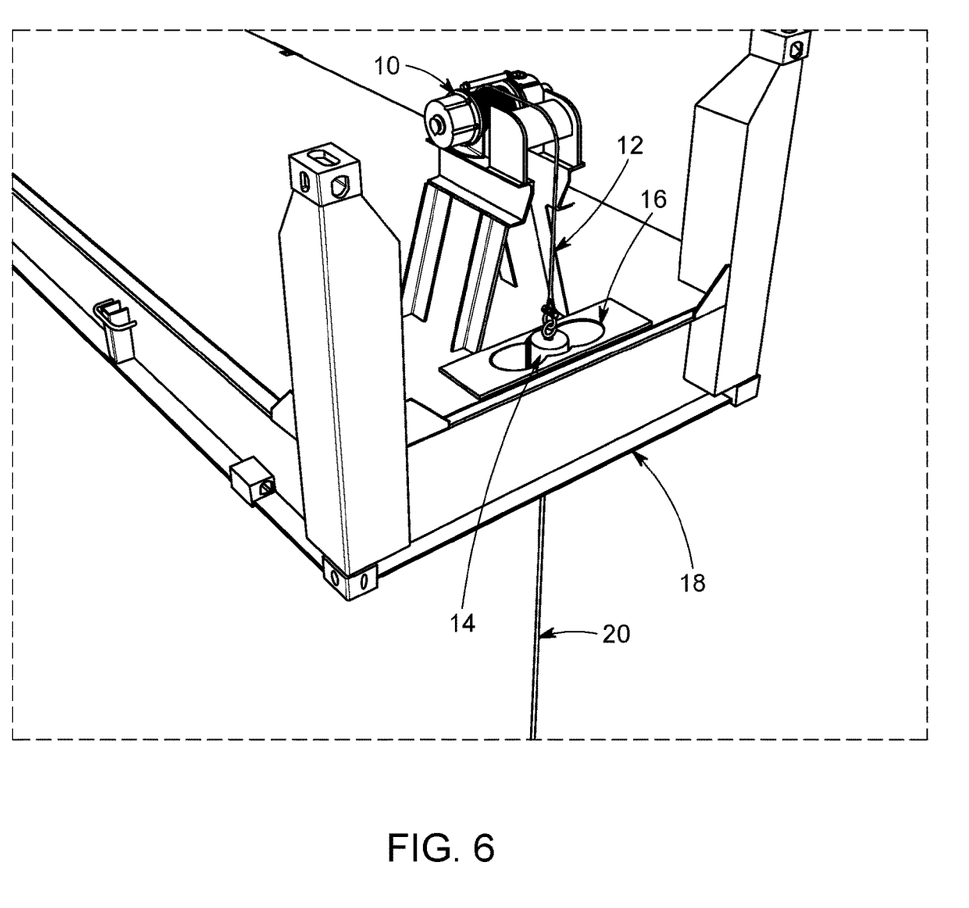
FIG. 6 is a perspective view of a support portion that is an alternative to the support portion shown in FIG. 4.

FIG. 6 describes another preferred embodiment where the support 18 has vertical beams allowing another container to be stacked on top of the support 18 without interfering with the motorized pull-in winch 10.

Figure 7A:
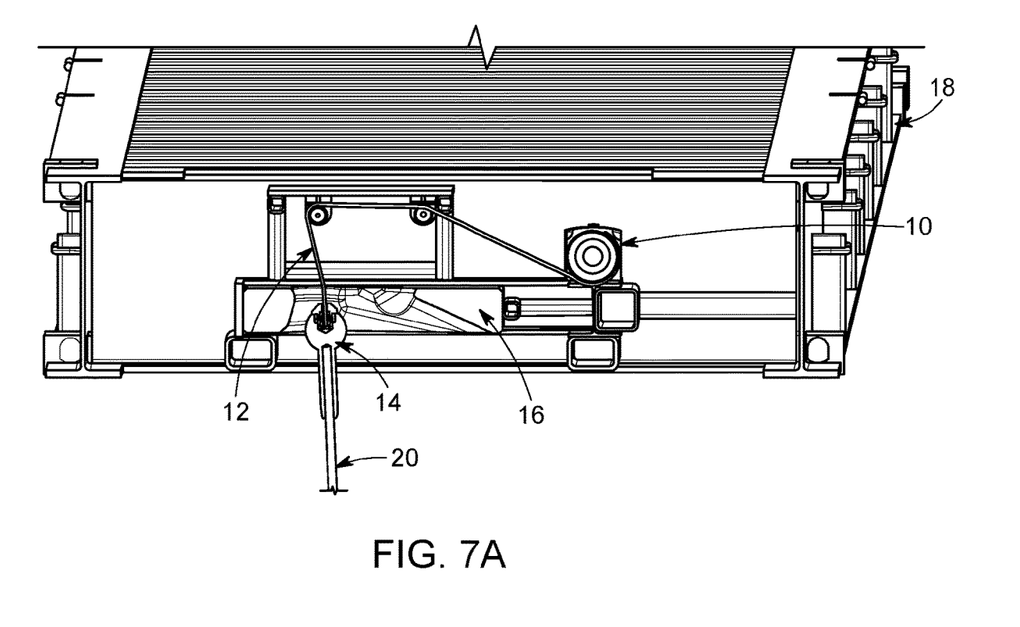
FIGS. 7A-7B are partially cut views illustrating a sequence for retaining a plug into a socket in a passive lock in a support portion that is another alternative to the support portion shown in FIG. 4.
Figure 7B:
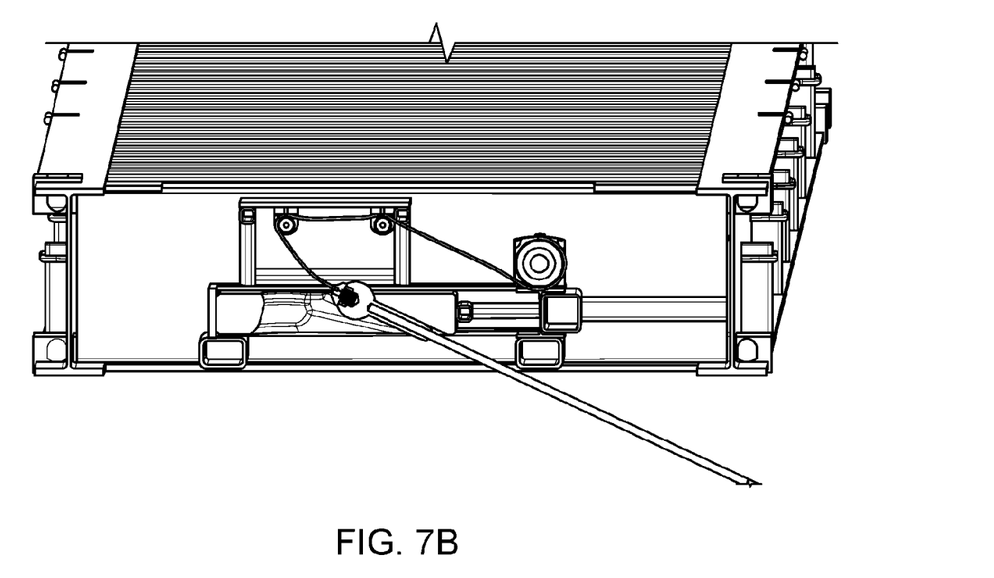

FIGS. 7A and 7B describes another preferred embodiment where the motorized pull-in winch 10 is recessed below a floor of the support 18. Also, the plug 14 has a spherical surface configured to engage the socket. In FIG. 7A, the plug 14 is shown passing through a passageway of the passive lock. In FIG. 7B, the plug 14 is shown retained by a shoulder in a socket of the passive lock.

EMBODIMENTS

In addition to the foregoing, the disclosure also contemplates at least the following Embodiments 1 to 3.12. It should be noted that any element of these embodiments may further include details related to this element that are disclosed in a paragraph or Figure describing the preferred embodiments without necessarily including details of other elements that are disclosed in the same or other paragraph or Figure.

Embodiment 1 is a lashing apparatus for deploying a lashing on cargo ships and securing shipping containers, comprising:
a support capable of interfacing with an interlocking system of one or more shipping containers, wherein the support includes an overhang portion that is configured to hang over a longitudinal end of the one or more shipping containers when the interlocking system interfaces with the one or more shipping containers;
a motorized pull-in winch attached to the support;
a pull-in line attached to the motorized pull-in winch;
electronics circuitry configured to drive the motorized pull-in winch for lifting or lowering the pull-in line;
a plug attached to the pull-in line;
a fastening line;
a releasable connector, wherein the fastening line is selectively couplable to the plug via the releasable connector; and
a lock provided in the overhang portion, the lock including a socket that is configured to receive and retain the plug.

Embodiment 1.01 is a lashing apparatus in accordance with Embodiment 1, wherein the pull-in line is selected from a cord, a rope, a string, a chain, a cable, or equivalent, that is useful for pulling the plug.

Embodiment 1.02 is a lashing apparatus in accordance with Embodiment 1 or Embodiment 1.01, wherein the fastening line is selected from a cord, a rope, a string, a chain, a cable, or equivalent.

Embodiment 1.03 is a lashing apparatus in accordance with Embodiment 1.02, wherein the fastening line is made of strands that are twisted together.

Embodiment 1.04 is a lashing apparatus in accordance with Embodiment 1.03, wherein the strands are made of fibers or wires.

Embodiment 1.05 is a lashing apparatus in accordance with any one of Embodiments 1 to 1.04, wherein the pull-in line is lighter than the fastening line and/or has a smaller diameter than the fastening line.

Embodiment 1.06 is a lashing apparatus in accordance with any one of Embodiments 1 to 1.05, wherein the support includes a forty-five feet long flat rack and is coupled to a standard forty feet long container.

Embodiment 1.07 is a lashing apparatus in accordance with any one of Embodiments 1 to 1.06, wherein the pull-in line is attached to the reel of the motorized pull-in winch.

Embodiment 1.08 is a lashing apparatus in accordance with any one of Embodiments 1 to 1.07, wherein the lashing is at least partially formed by the fastening line, and includes another releasable connector coupled with a connection line, which connection line is typically shorter than the fastening line (the other releasable connector coupling the fastening line and the connection line may be of a known type).

Embodiment 1.09 is a lashing apparatus in accordance with Embodiment 1.08, wherein the connection line is lighter than the fastening line and/or has a smaller diameter than the fastening line.

Embodiment 1.10 is a lashing apparatus in accordance with Embodiment 1.08, wherein the connection line is not lighter than the fastening line and/or does not have a smaller diameter than the fastening line.

Embodiment 1.11 is a lashing apparatus in accordance with any one of Embodiments 1.08 to 1.10, wherein the connection line is less stiff that the fastening line.

Embodiment 1.12 is a lashing apparatus in accordance with any one of Embodiments 1 to 1.11, wherein, the motorized pull-in winch and the lock are located below a floor of the support.

Embodiment 1.13 is a lashing apparatus in accordance with any one of Embodiments 1 to 1.12, wherein the support is capable of interfacing with an interlocking system of one or more shipping containers stacked in a column of containers.

Embodiment 1.14 is a lashing apparatus in accordance with any one of Embodiments 1 to 1.13, wherein the support includes a flat rack.

Embodiment 1.15 is a lashing apparatus in accordance with any one of Embodiments 1 to 1.14, wherein the support has vertical beams allowing another container to be stacked on top of the support without interfering with the motorized pull-in winch.

Embodiment 1.16 is an apparatus in accordance with any one of Embodiments 1 to 1.15, wherein at least a portion of the electronics circuitry is provided in a cavity of the plug.

Embodiment 1.17 is an apparatus in accordance with Embodiment 1.16, wherein a tension monitor, its associated electronics, and a battery is provided in the cavity of the plug.

Embodiment 1.18 is an apparatus in accordance with any one of Embodiments 1 to 1.17, wherein the socket is configured to receive and passively retain the plug, such as with a shoulder.

Embodiment 1.19 is an apparatus in accordance with Embodiment 1.18, wherein the lock includes a plurality of sockets configured to receive and passively retain the plug (for example, 2 sockets) or wherein the apparatus comprises at least one further lock including a socket that is configured to receive and retain a plug which is of a different design to another lock of the apparatus.

Embodiment 1.20 is an apparatus in accordance with any of Embodiments 1 to 1.19, wherein the lock further includes a passageway sized to allow the plug to pass through the overhang portion when the plug is lifted by the motorized pull-in winch.

Embodiment 1.21 is an apparatus in accordance with any one of Embodiments 1 to 1.17, wherein the socket is configured to receive a ram for actively extending into the socket to retain the plug.

Embodiment 1.22 is an apparatus in accordance with Embodiment 1.21, wherein the plug may pass through the socket in either an upward or downward direction when a ram is actively retracted.

Embodiment 1.23 is an apparatus in accordance with any one of Embodiments 1 to 1.22, wherein the socket has a middle axis that is tilted relatively to the vertical direction and substantially tangent to a circumference of a line guide of the motorized pull-in winch. As such, the plug may tilt and be substantially aligned with the middle axis when the fastening line is reeled in.

Embodiment 2 is a lashing system for deploying a lashing on cargo ships and securing shipping containers, wherein the system comprises a lashing apparatus in accordance with any of Embodiments 1 to 1.23 and a bucket adapted to be coupled to a structure of the cargo ship, wherein the releasable connector of the lashing apparatus is a first releasable connector and wherein the bucket is configured to receive the plug.

Embodiment 2.01 is a system in accordance with Embodiment 2, wherein the structure of the cargo ship is a lashing bridge or a deck of the cargo ship.

Embodiment 2.02 is a system in accordance with Embodiment 2 or Embodiment 2.01, wherein the system further comprises rigging equipment (for example, previously existing on the cargo ship) for use in applying tension to the fastening line of the lashing apparatus.

Embodiment 2.03 is a system in accordance with Embodiment 2 or Embodiment 2.01, further comprising a foundation adapted to be coupled to at least one of a lashing bridge or a deck of the cargo ship, wherein a tensioning winch is attached to the foundation, a connection line is attached to the tensioning winch, and a second releasable connector couples the connection line to the fastening line. As such, tension may be applied to the fastening line using the connection line and the tensioning winch.

Embodiment 2.04 is a system in accordance with Embodiment 2.03, wherein the foundation is coupled substantially in a middle of the at least one of the lashing bridge or the deck of the cargo ship.

Embodiment 2.05 is a system in accordance with Embodiment 2.03 or Embodiment 2.04, wherein the foundation includes another tensioning winch attached to the foundation, another connection line attached to the other tensioning winch, and another second releasable connector.

Embodiment 2.06 is a system in accordance with any one of Embodiments 2.03 to 2.05, wherein the fastening line of the lashing apparatus has a standard length.

Embodiment 2.07 is a system in accordance with any one of Embodiments 2.03 to 2.06, wherein the system further comprises a plurality of connections lines, each having a different length based on a height of a side stack of a given number of containers, the standard length, and, optionally, a location where the foundation is coupled to the at least one of the lashing bridge or the deck of the cargo ship. As such, when the stack of shipping containers has various configurations and the height of the containers on which the support is located varies, this height variation can be accommodated using a selected one of the plurality of connections lines.

Embodiment 2.08 is a system in accordance with any one of Embodiments 2.03 to 2.07, wherein the fastening line has a standard length based on a location where the foundation is coupled to the at least one of the lashing bridge or the deck of the cargo ship and is usable regardless of a height of a side stack of a given number of containers. The connection line and the tensioning winch are such that they can accommodate different heights of the side stack by reeling in the connection line on the tensioning winch. As such, when the stack of shipping containers has various configurations and the height of the containers on which the support is located varies, this height variation can be accommodated using the tensioning winch.

Embodiment 2.09 is a system in accordance with Embodiment 2.07 or Embodiment 2.08, wherein the side stack of containers is located at a starboard side of the cargo ship.

Embodiment 3 is a method of deploying a lashing on cargo ships and securing shipping containers comprising the steps of providing an apparatus in accordance with any one of Embodiments 1 to 1.23; interfacing the support with an interlocking system of one or more shipping containers, coupling the fastening line to the plug via the (first) releasable connector, lifting the pull-in line until the plug is above the socket, and lowering the pull-in line until the plug is received and retained in the socket.

Embodiment 3.01 is a method in accordance with Embodiment 3, further comprising the step of passing the plug through a passageway provided in the overhang portion when the plug is lifted by the pull-in winch.

Embodiment 3.02 is a method in accordance with Embodiment 3 or Embodiment 3.01, wherein the plug is passively retained in the socket, wherein the socket has a middle axis that is tilted relative to vertical and substantially tangent to a circumference of a line guide of the motorized pull-in winch.

Embodiment 3.03 is a method in accordance with any of Embodiments 3 to 3.02, comprising the steps of providing a system in accordance with any of Embodiments 2.03 to 2.06, coupling the foundation to at least one of a lashing bridge or a deck of the cargo ship, and coupling the connection line to the fastening line, and optionally further comprising applying tension to the fastening line by reeling in the connection line with the tensioning winch.

Embodiment 3.04 is a method in accordance with Embodiment 3.03 further comprising selecting the connection line from a plurality of connections lines of different lengths.

Embodiment 3.05 is a method in accordance with Embodiment 3.04, wherein the selection is based on a height of a side stack of containers with which the support interfaces, the length of the fastening line, and, optionally, a location where the foundation is coupled to the at least one of the lashing bridge or the deck of the cargo ship.

Embodiment 3.06 is a method in accordance with Embodiment 3.05 wherein the side stack of containers is located at a starboard side of the cargo ship.

Embodiment 3.07 is a method in accordance with any one of Embodiments 3.03 to Embodiment 3.06, wherein the fastening line has a standard length based on a location where the foundation is coupled to the at least one of the lashing bridge or the deck of the cargo ship and is usable regardless of a height of a side stack of a given number of containers.

Embodiment 3.08 is a method in accordance with Embodiment 3.07, wherein the method further comprises the step of accommodating different heights of the side stack by reeling in the connection line on the tensioning winch.

Embodiment 3.09 is a method in accordance with any one of Embodiments 3.03 to 3.08, wherein the tensioning winch is coupled substantially in the middle of the at least one of the lashing bridge or the deck of the cargo ship, another tensioning winch is attached, directly or indirectly, next to the tensioning winch, another connection line attached to the other tensioning winch, and another second releasable connector.

Embodiment 3.10 is a method in accordance with Embodiment 3.09, wherein the method further comprises the steps of deploying another lashing, attaching the other lashing to the other tensioning winch, and applying tension to the other lashing by reeling in the other lashing.

Embodiment 3.11 is a method in accordance with Embodiment 3.10, wherein the other lashing is segmented as described herein (for example, including a wire rope that has a standard length, and either one of a plurality of connections ropes each having a different length).

Embodiment 3.12 is a method in accordance with any one of Embodiments 3.05 to 3.08, wherein the side stack of containers is located at a starboard side of the cargo ship, wherein the foundation is coupled substantially in a middle of the at least one of the lashing bridge or the deck of the cargo ship; wherein the foundation includes another tensioning winch attached to the foundation, another connection line attached to the other tensioning winch, and another second releasable connector; the method further comprising: deploying another fastening line and securing another stack of containers located at a port side of the cargo ship; coupling the other connection line to the other fastening line; and applying tension to the other fastening line by reeling in the other connection line with the other tensioning winch.

What is claimed is:

1. A lashing apparatus for deploying a lashing on cargo ships and securing shipping containers, comprising:
    a support capable of interfacing with an interlocking system of one or more shipping containers, wherein the support includes an overhang portion that is configured to hang over a longitudinal end of the one or more shipping containers when the interlocking system interfaces with the one or more shipping containers;
    a motorized pull-in winch attached to the support;
    a pull-in line attached to the motorized pull-in winch;
    electronics circuitry configured to drive the motorized pull-in winch for lifting or lowering the pull-in line;
    a plug attached to the pull-in line;
    a fastening line;
    a releasable connector, wherein the fastening line is selectively couplable to the plug via the releasable connector; and
    a lock provided in the overhang portion, the lock including a socket that is configured to receive and retain the plug.

2. The lashing apparatus of claim 1, wherein the electronics circuitry is provided at least partially in a cavity of the plug.

3. The lashing apparatus of claim 2, wherein the cavity of the plug further comprises a battery.

4. The lashing apparatus of claim 1, wherein the socket is configured to receive and passively retain the plug.

5. The lashing apparatus of claim 1, wherein the lock further includes a passageway sized to allow the plug to pass through the overhang portion when the plug is lifted by the motorized pull-in winch.

6. The lashing apparatus of claim 4, wherein the socket has a middle axis that is tilted relative to vertical and substantially tangent to a circumference of a line guide of the motorized pull-in winch.

7. A lashing system for deploying a lashing on cargo ships and securing shipping containers, comprising:
    a lashing apparatus including:
        a support capable of interfacing with an interlocking system of one or more shipping containers, wherein the support includes an overhang portion that is configured to hang over a longitudinal end of the one or more shipping containers when the interlocking system interfaces with the one or more shipping containers;
        a motorized pull-in winch attached to the support;
        a pull-in line attached to the motorized pull-in winch;
        electronics circuitry configured to drive the motorized pull-in winch for lifting or lowering the pull-in line;
        a plug attached to the pull-in line;
        a fastening line;
        a first releasable connector, wherein the fastening line is selectively couplable to the plug via the releasable connector; and
        a lock provided in the overhang portion, the lock including a socket configured to receive and retain the plug; and
    a bucket adapted to be coupled to a structure of a cargo ship, wherein the bucket is configured to receive the plug.

8. The lashing system of claim 7 further comprising a foundation, wherein
    the foundation is adapted to be coupled to at least one of a lashing bridge or a deck of the cargo ship;
    a tensioning winch is attached to the foundation;
    a connection line is attached to the tensioning winch;
    a second releasable connector couples the connection line to the fastening line.

9. The lashing system of claim 8, wherein the fastening line has a standard length based on a location where the foundation is coupled to the at least one of the lashing bridge or the deck of the cargo ship and is usable regardless of a height of a side stack of a given number of containers.

10. A method of deploying a lashing on cargo ships and securing shipping containers, comprising:
    providing a lashing apparatus including a support including an overhang portion, a motorized pull-in winch attached to the support, a pull-in line attached to the motorized pull-in winch, electronics circuitry configured to drive the motorized pull-in winch, a plug attached to the pull-in line, a lock provided in the overhang portion, the lock including a socket, and a first releasable connector;
    interfacing the support with an interlocking system of one or more shipping containers, wherein the support overhang portion is configured to hang over a longitudinal end of the one or more shipping containers when the interlocking system interfaces with the one or more shipping containers;
    coupling a fastening line to the plug via the first releasable connector;
    lifting the pull-in line until the plug is above the socket; and
    lowering the pull-in line until the plug is received and retained in the socket.

11. The method of claim 10 further comprising passing the plug through a passageway provided in the overhang portion when the plug is lifted by the pull-in winch.

12. The method of claim 11, wherein the plug is passively retained in the socket, wherein the socket has a middle axis that is tilted relative to vertical and substantially tangent to a circumference of a line guide of the motorized pull-in winch.

13. The method of claim 10 further comprising:
providing a foundation, wherein the foundation includes a tensioning winch attached to the foundation, a connection line attached to the tensioning winch, and a second releasable connector;
coupling the foundation to at least one of a lashing bridge or a deck of a cargo ship;
coupling the connection line to the fastening line; and
applying tension to the fastening line by reeling in the connection line with the tensioning winch.

14. The method of claim 13, wherein a length of the fastening line is based on a location where the foundation is coupled to the at least one of the lashing bridge or the deck of the cargo ship and is usable regardless of a height of a side stack of containers with which the support interfaces.

15. The method of claim 14,
wherein the side stack of containers is located at a starboard side of the cargo ship,
wherein the foundation is coupled substantially in a middle of the at least one of the lashing bridge or the deck of the cargo ship;
wherein the foundation includes another tensioning winch attached to the foundation, another connection line attached to the other tensioning winch, and another second releasable connector;
the method further comprising:
deploying another fastening line and securing another stack of containers located at a port side of the cargo ship;
coupling the another connection line to the another fastening line; and
applying tension to the another fastening line by reeling in the another connection line with the another tensioning winch.

* * * * *